United States Patent [19]

Erwin

[11] 4,231,440
[45] Nov. 4, 1980

[54] ROTARY, SEGMENTED, EXPANSIBLE VALVES

[75] Inventor: Robert L. Erwin, Farmington, N. Mex.

[73] Assignee: J. D. Kinsey, Farmington, N. Mex.; a part interest

[21] Appl. No.: 41,069

[22] Filed: May 21, 1979

[51] Int. Cl.³ .............................................. F16K 3/36
[52] U.S. Cl. ............................... 137/246.22; 251/161; 251/162; 251/163
[58] Field of Search ................... 137/246.22; 251/161, 251/162, 163

[56] References Cited

U.S. PATENT DOCUMENTS

| | | | |
|---|---|---|---|
| 2,612,340 | 9/1952 | Laurent | 251/161 X |
| 3,061,267 | 10/1962 | Hamer | 137/246.22 X |

*Primary Examiner*—Harold W. Weakley

[57] ABSTRACT

A rotary, segmented, expansible valve comprising a valve body having a fluid passage and a body opening intersecting the fluid passage, a valve member rotatably mounted in the valve body opening and divided into four quarter segments, the valve member having an opening to register with the fluid passage of the valve body, the valve member opening extending through one opposed pair of the quarter segments, the other opposed pair of the quarter segments being solid and forming fluid stops when registered with the fluid passage, a tube lining the valve member opening, the one opposed pair of quarter segments being slidably mounted on the tube and sealed with respect thereto, a valve stem and handle for rotating the valve member between open and closed positions, valve seats in the valve body opening where the opening intersects the fluid passage, and an expander for selectively expanding the opposed pairs of quarter segments outwardly against the valve seats to form a fluid seal between the expanded quarter segments and the valve seats.

13 Claims, 12 Drawing Figures

ROTARY, SEGMENTED, EXPANSIBLE VALVES

BACKGROUND OF THE INVENTION

1. Field of the Invention

This invention relates to valves and, more particularly to rotary, segmented, expansible valves.

2. Description of the Prior Art

In rotary valves used particularly in high pressure and/or high temperature fluid systems, it is desirable to be able to turn the valve rotor between its open and closed positions with minimum frictional resistance, and yet to be able to seal the valve in the open and closed positions so that the fluids in the system do not enter the valve chamber. It is particularly important to keep the system fluids out of the valve chamber in which the valve rotates when the system fluids are corrosive.

Patents representative of the prior art relating to rotary expansible valves are: U.S. Pat. Nos. 321,694, 426,635, 733,905, 1,949,191, 2,072,965, 2,246,764, 2,639,882, 2,729,421, 2,744,720, 3,193,244, 3,365,168, 3,746,302.

None of the patents listed above disclose the present invention which is distinguished by a number of features not found in the patents listed above.

SUMMARY OF THE INVENTION

It is an object of this invention to provide an improved rotary valve of the type comprising a valve body having a fluid passage and a body opening intersecting the fluid passage, and an expandable valve member rotatably mounted in the body opening to selectively open and close the fluid passage.

It is a further object of this invention to provide an improved rotary valve having an expandable valve member which is divided into four quarter segments. The four quarter segments fit together in contiguous relationship to form the whole valve member. Any two opposed quarter segments are expandable outwardly simultaneously into sealing contact with valve seats provided in the valve body opening and encompassing the fluid passage adjacent inlet and outlet ports. One pair of the opposed quarter segments have aligned openings therethrough, and a tube extends through the openings on which the segments of the one pair slide. O-ring seals in the openings of the quarter segments of the one pair seal the segments with respect to the tube. The other pair of opposed quarter segments are blind (without openings) and have inner faces which conform to the outer surface of the tube. An actuator is connected to the valve member for rotating the valve member between an open position, where the one pair of quarter segments with the tube are brought into register with the fluid passage in the valve body, and a closed position, where the pair of blind quarter segments are brought into register with the fluid passage. An expander is provided for selectively expanding the one pair of quarter segments outwardly against the valve seats when the valve member is in the open position, and for expanding the pair of blind quarter segments outwardly against the valve seats when the valve member is in the closed position.

It is a further object of the invention to provide an expander for the expandable member which comprises a stem which projects outwardly through the valve body opening. An expander handle is attached to the outer end of the expander stem, and a disk is integrally formed on the inner end of the stem. The disk has a row of sockets formed therein in which a row of roller bearings are freely mounted for rotation therein. The outer roller bearings project outwardly beyond the periphery of the disk and provide opposite cam lugs. An oblong recess of generally elliptical shape is provided in one end of the valve member which faces outwardly through the valve opening and which receives therein the expander disk and roller bearings. The recess has a major axis which lies in a first plane passing through one set of interfaces between the one pair of opposed segments and adjacent blind segments, and a minor axis which lies in a second plane which passes through a second set of interfaces between the one pair of opposed segments and the adjacent blind segments and is perpendicular to the first plane. The expander is in a neutral position when the row of roller bearings is aligned with the major axis of the oblong recess, the major axis being slightly greater than the maximum distance along the rows of roller bearings. Rotation of the expander from its neutral position in either direction causes the outer roller bearings to make rolling contact with the surface of the recess, whereby, depending upon which direction the expander is turned, either the blind segments are forced outwardly, or the one pair of segments which slide on the tube are forced outwardly. Normally the expander is maintained in its neutral position when the valve member is rotated, so that the valve segments will be free to move inwardly into a contracted position out of contact with the valve seats in the valve body. When the valve member is in its open position with the tube through the one pair of segments in register with the fluid passage in the valve body, the expander is rotated to move the one pair of segments outwardly. When the valve member is in its closed position, the expander is rotated to move the blind segments outwardly.

It is a further object of this invention to provide a hollow valve stem which is splined to the segmented valve member above described and which extends outwardly through the opening in the valve body. A handle is attached to the outer end of the valve stem for turning same and a pointer projects laterally from the handle to indicate the position of the valve member with respect to its open and closed positions. Limit stops are provided at the open and closed positions of the pointer to limit the movement of the pointer to the arcuate distance between the limit stops. The hollow valve stem rotatably receives the expander stem therein.

It is a further object of this invention to provide the expander stem above described with a through axial passage and a grease fitting attached in the axial passage at the outer end of the stem for the application of grease into the interior of the valve body for lubricating the moving parts therein.

It is a further object of the invention to provide an expandable segmented valve member having a tubular conduit extending through a pair of the expandable segments and being sealed by O-rings therein. The tubular conduit provides a continuation of the fluid passage through the valve body when the valve member is turned to register the tubular conduit with the valve body opening, so that fluid will flow through the fluid passage and tubular conduit without turbulence or restriction of any kind at the point where the valve is installed. The tubular conduit in open position is sealed into both the upstream and downstream ports of the valve so that fluid does not enter the valve body opening outside of the tubular conduit.

An advantage of the valves of this invention is that greater tolerance can be provided between the valve member and seats so that there is low friction when turning the valve member between its open and closed positions. In other words, low torque is required to turn the valve member to shut off fluid flow.

The expander unit of this invention including roller bearings for exerting pressure upon the walls of an eccentric recess in one end of a segmented valve member makes it possible to force selected opposed pairs of segments upon the valve seat into an extremely tight seal with minimum effort. The unique recess or eccentric chamber shape permits only the segments desired to be moved without disturbing the other segments. One set of opposing segments is moved by rotating the expander in one direction, and the other set is moved by turning the expander in the other direction.

The features of this invention may be incorporated in different types of rotary valves, however, they are particularly applicable to cylinder and ball valves which are illustrated and described herein by way of specific examples. In the cylinder valves, the valve seats are the wall surfaces of the opening in the valve body in which the segmented cylindrical valve member rotates. In the ball valves of this invention, separate valve seats conforming to the shape of the ball valve member are installed through inlet and outlet ports of the fluid passage in the valve body.

The valve member segments of this invention are expandable into metal to metal contact with the metal valve seats thereby making the valves safe in the event of fire against leakage. Each valve segment floats independently of an opposing segment. The opposite segments may be reversed for different seat matches.

The valve segments may be removed and renewed without removing the valve body from the line.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which.

DESCRIPTION OF THE PREFERRED EMBODIMENTS

Figure 1:
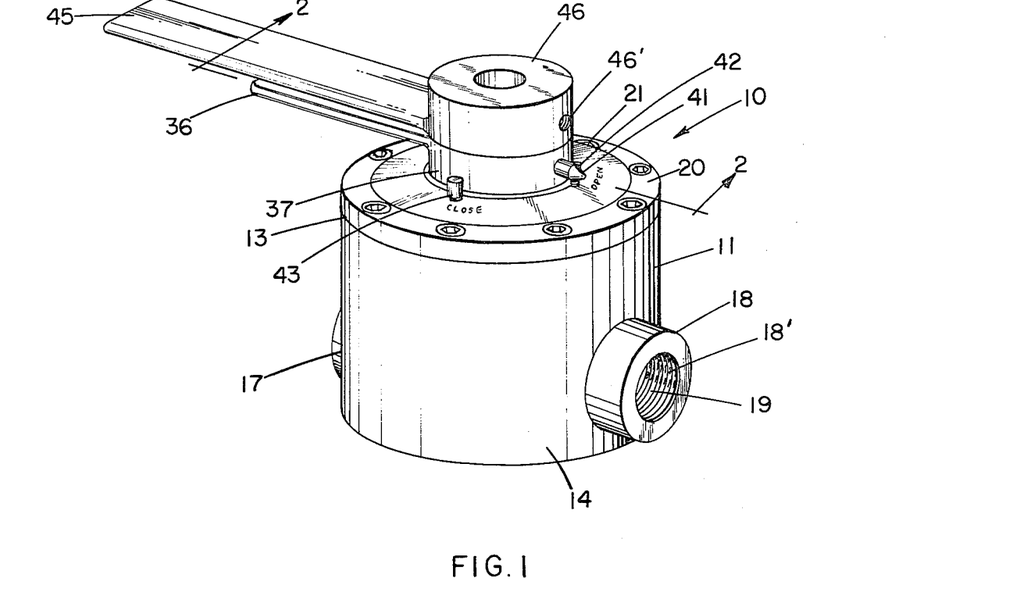
FIG. 1 is a perspective view of a rotary segmented, expansible plug valve forming one embodiment of this invention.
Figure 2:
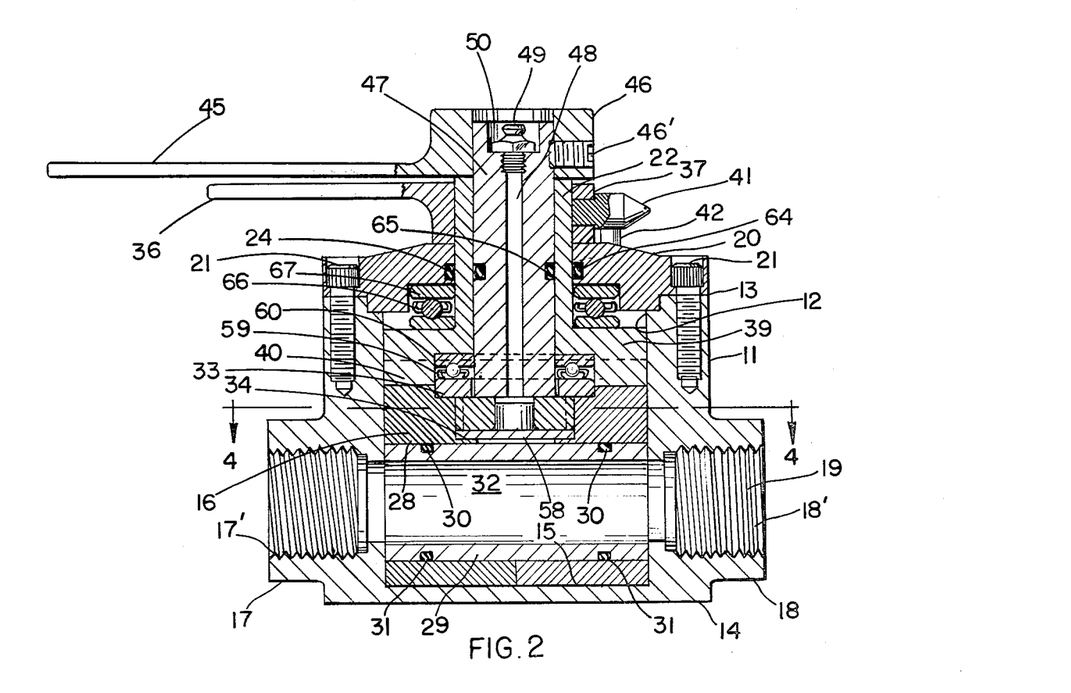
FIG. 2 is a sectional view taken on line 2—2 of FIG. 1.

Referring now to FIGS. 1–6 of the accompanying drawings, the rotary plug valve assembly in accordance with this invention is designated generally by the reference numeral 10 and embodies in its construction a cylindrical valve body 11 which is provided with a central cylindrical bore 12 extending inwardly into the valve body 11 from one end 13 and terminating short of the opposite end 14 leaving a closed bottom wall 15. The bore 12 serves as a valve chamber in which a segmented, rotary valve plug, generally indicated at 16, is inserted through the open end 13 of the valve body 11. A pair of cylindrical bosses 17 and 18 extend from opposite sides of the valve body, and a lateral bore 19 extends through the bosses 17 and 18 intersecting the central bore 12. The bosses 17 and 18 are provided with internal threads 17' and 18' respectively for connecting the valve body to fluid conduits (not shown). The lateral bore 19 provides a passage through the valve body by means of which fluid enters and leaves the valve chamber 12. The valve body 11 is closed by a valve bonnet 20 which is secured to the open end 13 of the valve body by means of a plurality of bolts 21 threaded into body 11 while a valve stem 22 extends upwardly through an aperture 23 in the bonnet. An O-ring seal 24 is provided in a groove 25 formed in the cylindrical wall 26 of the bonnet surrounding the aperture 23. The O-ring 24 provides a fluid tight seal between the bonnet 20 and the valve stem 22. The cylindrical valve plug 16 comprises four ninety-degree segments 27, designated 27-1, 27-2, 27-3 and 27-4 respectively. Each of the segments 27 has a cylindrical outer wall surface 27a, and flat side wall surfaces 27b and 27c. The planes in which the side wall surfaces 27b and 27c are located intersect each other at right angles along the axis of the plug valve. Two of the opposite plug valve segments 27-2 and 27-4 each have a bore 28 extending laterally therethrough in which a cylindrical sleeve 29 has its opposite ends fitted. Radially outwardly open grooves 30, 30 are formed circumferentially in the outer surface of the sleeve 29 to provide seats for O-ring seals 31,31. The grooves 30,30 are each spaced inwardly from the opposite ends of the sleeve 29 a short distance so that the O-ring seals 31 seated therein sealingly engage the cylindrical inner walls of the plug valve segments 27-2 and 27-4 surrounding the bores 28. The sleeve 29 has a through passage 32 therein which communicates with the lateral bore 19 in the valve housing when the valve plug 16 is in the open position as shown in FIG. 2. When the rotary plug 16 is in the closed position, the sleeve 29 is rotatably displaced ninety degrees from the position shown in FIG. 2 to the position shown in FIG. 5 where the sleeve is indicated by hidden lines.

Figure 4:
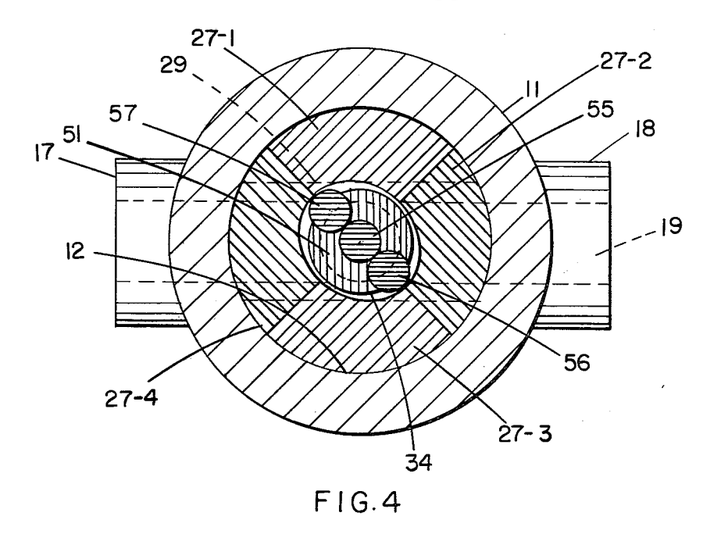
FIG. 4 is a sectional view taken on line 4—4 of FIG. 2 showing the valve plug in the open position.

Considering the segmented plug 16 as a whole, stepped recesses 33 and 34 are provided centrally in the top of the plug as seen in FIG. 2. The outer, larger recess 33 is cylindrical, while the inner recess 34 is generally oval in shape. The major axis of the recess 34 extends in alignment with the interfaces between segments 27-4 and 27-1 and between segments 27-2 and 27-3 while the minor axis of the recess 34 extends in alignment with the interfaces between segments 27-1 and 27-2 and between segments 27-3 and 27-4 as seen in FIG. 4. A keyway 35 is provided diametrically across the top of the plug segments 27-1 and 27-3.

An actuator for rotating the valve plug 16 between its open and closed positions includes a handle 36 which projects laterally from a ring 37 surrounding the valve stem 22 and is secured thereon by means of a set screw 38. The cylindrical valve stem 22 extends downwardly through the valve bonnet 20. An annular radial flange 39 having a diameter slightly smaller than the diameter of the central bore 12 extends laterally outwardly from the inner end of the valve stem 22, and an interrupted key 40 is integral with and depends from the underside of the flange 39. The key 40 engages in the keyway 35 of the valve segments 27-1 and 27-3 so that when the valve stem 22 is rotated by a turning force applied to the handle 36, the valve plug 16 is rotated by the interlocking engagement of the key 40 and keyway 35. The ring 37 includes a pointer 41 projecting outwardly therefrom diametrically opposite the handle 36. The pointer is adapted to move between a pair of limit stops 42 and 43 projecting upwardly from the valve bonnet 20. The limit stops are arcuately spaced about a circle which is concentric with the valve stem so as to limit the movement of the pointer 41 through a ninety-degree arc from an open position as shown in FIG. 1 where the pointer engages the limit stop 42 to a closed position where the pointer engages the limit stop 43 and vice versa. Preferably the indicia "Open" and "Close" are engraved on the valve bonnet 20 beside the limit stops 42 and 43 respectively.

Figure 3:
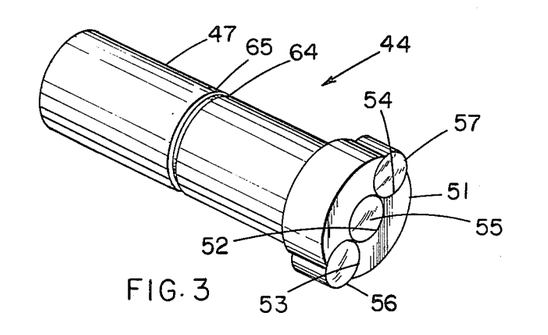
FIG. 3 is a perspective view of the expander assembly removed from the valve shown in FIG. 1.
Figure 5:
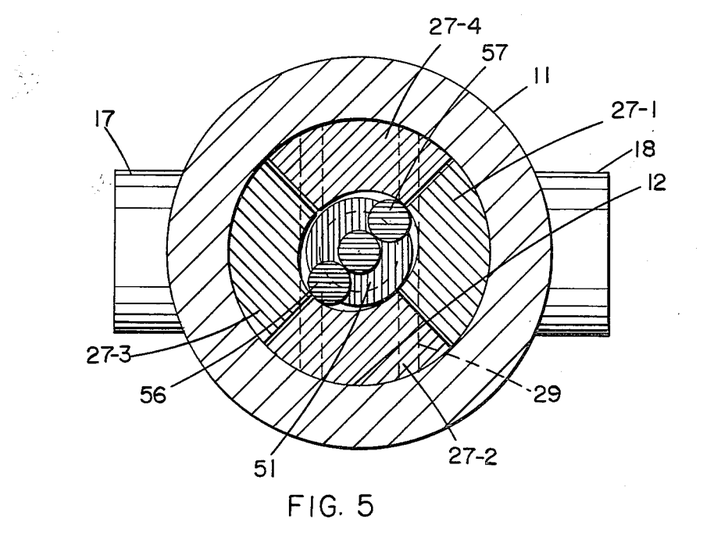
FIG. 5 is a sectional view corresponding to the sectional view shown in FIG. 4, but showing the valve plug in the closed position.
Figure 6:
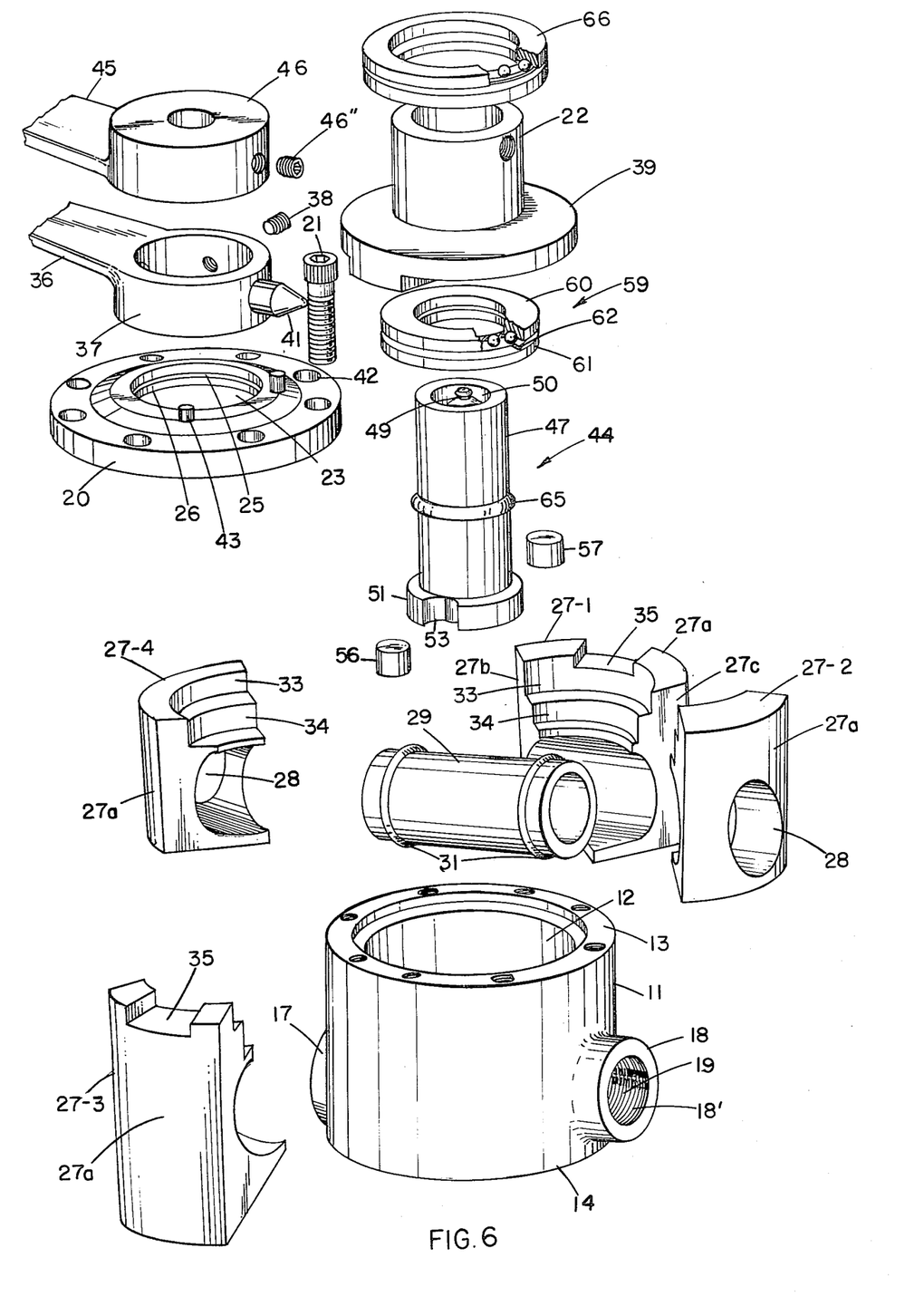
FIG. 6 is an exploded perspective view of the valve shown in FIG. 1.

An actuator for expanding the valve segments 27 outwardly into metal to metal contact with the surface of the valve chamber 12, comprises an expander assembly 44 illustrated in FIGS. 2 and 3, and an expander handle 45 attached to a hub 46 which is secured to one end of the expander assembly 44 by a set screw 46'. The expander assembly 44 includes a cylindrical expander stem 47 which extends upwardly through the hollow valve stem 22 and projects upwardly beyond the ring 37. The expander stem 47 has an axial bore 48 extending therethrough and a grease fitting 49 secured in the outer end of the axial bore 48 by screw threads. A central recess 50 extends inwardly from the outer end of the expander stem 47 a sufficient distance so that the grease fitting 49 is confined entirely within the recess. A cylindrical disk 51 of larger diameter than the expander stem 47 is integrally attached on the inner end of the expander stem. The diameter of the disk 51 is less than the minor axis of the recess 34 so that the disk is freely rotatable within the recess 34. The disk 51 has three diametrically aligned cylindrical bores formed therein, all of equal diameter. The three bores comprise a central bore 52 and opposite outer bores 53 and 54. Each of the outer bores 53 and 54 is tangential to the central bore 52 and a segment of each of the outer bores, less than 180°, lies outside of the disk 51. Within the bores 52, 53 and 54 are freely mounted cylindrical metal rollers or bearings 55, 56 and 57 of slightly less diameter than the diameter of the bores in which they are mounted. The diametrical distance across the three cylindrical bearings 55, 56 and 57 is less than the major axis across the recess 34 when the segments of the valve plug 16 are fully contracted, but it is substantially greater than the minor axis across the recess 34. In the contracted condition of the valve plug 16, the cylindrical bearings 55, 56 and 57 will be aligned with the major diameter of the recess 34 in the valve plug 16 as shown in FIGS. 4 and 5. It will be apparent that rotation of the expander stem 47 and disk 51 causes the outer cylindrical bearings 56 and 57 to engage the inner surfaces of an opposite pair of valve plug segments 27. Since the diametrical distance across the recess 34 decreases from the major axis to the minor axis of the recess (in the contracted condition of the valve plug), rotation of the disk 51 and of the bearings 55, 56, 57 cams the opposite pair of segments 27 outwardly into tight contact with the inner wall of the valve chamber 12, thus providing a tight metal to metal seal between the expanded opposite pair of valve segments and the valve chamber 12. A spacer disk 58 is seated in the bottom of the recess 34 to fill up the space between the end of the expander disk 51 and the bottom of the recess 34. The spacer disk 58 keeps the cylindrical bearings 55, 56 and 57 properly seated in their respective socket bores 52, 53 and 54. The expander stem 47 is sealed with respect to the hollow valve stem 22 by means of an O-ring seal 64 which is seated in a circumferential groove 65 provided in the stem 47 approximately midway of its length.

A ball thrust bearing 59 is provided in the recess 33 above the recess 34 in the valve plug 16. The bearing 59 includes upper and lower thrust plates 60 and 61 and a set of balls and a ball retainer 62 (see FIG. 6). The cylindrical flange 39 at the bottom of the valve stem 22 has a central cylindrical recess in the bottom side thereof immediately above the recess 33 and of the same diameter as the recess 33 inorder to seat the upper thrust plate 60 of the ball thrust bearing 59.

A second ball thrust bearing 66 is positioned between the top of the valve stem flange 39 and the underside of valve bonnet 20. The underside of the valve bonnet is provided with a central recess 67 in which the upper side of the ball thrust bearing 66 is mounted.

When the valve 10 is used in low pressure fluid systems, the ball thrust bearings 59 and 66 are unnecessary and can be omitted from the valve 10 when the valve is manufactured.

The operation of the valve 10 will be understood from the following description:

The valve 10 as shown in FIGS. 1, 2 and 4 is in the open position with the opposed valve plug segments 27-2 and 27-4 and the sleeve 29 contained therein aligned with the fluid passage 19 through the valve body 11. The open position of the valve plug 16 is indicated by the pointer 41 attached to the hub of the valve plug actuator handle 36, since the pointer bears against the open position limit stop 42.

The position of the handle 45 for the valve plug expander actuator assembly 44 in parallel alignment with the handle 36 indicates that the valve plug expander assembly is in its neutral position as seen in FIG. 4. The expander actuator is in its neutral position when the aligned roller bearings 55, 56 and 57 are in alignment with the major axis of the oblong recess 34. With the valve plug 16 in the open position, the plug segments 27-2 and 27-4 containing the sleeve 29 may be expanded outwardly by turning the expander stem 47 counter clockwise (see FIG. 4), thereby forcing the outer roller bearings 56 and 57 against the eccentric wall surfaces of the plug segments 27-2 and 27-4 respectively within the recess 34. As the stem 47 is rotated counter clockwise by the long lever arm of the expander handle 45, a large force is applied through the bearings 56 and 57 to force the plug segments 27-2 and 27-4 to slide outwardly along the sleeve 29 and into metal to metal contact with the cylindrical wall of the bore 12. The cylindrical wall of bore 12 surrounding the fluid passage 19 provides the valve seat for the expanded plug segments forced into contact therewith.

When it is desired to close the valve 10, the handles 36 and 45 (in parallel alignment as shown in FIG. 1) are grasped and rotated clockwise simultaneously until the pointer 41 strikes the close limit stop 43. In so doing, the plug 16 is rotated clockwise to the position shown in FIG. 5 where the sleeve 29 (shown by hidden lines) and the plug segments 27-2 and 27-4 are perpendicular to the axis of the passage 19 extending through the valve body 11. The solid, or blind segments 27-1 and 27-3 are moved to a position closing the fluid passage 19. By turning the expander handle 45 clockwise past the plug actuator handle 36, the blind segments 27-1 and 27-3 are forced outwardly against the cylindrical wall of the bore, or valve member 12, thus forming a metal to metal contact fluid seal and completely blocking the passage 19 on opposite sides of the valve chamber 12.

In order to unseal the valve 10 so that the plug 16 may be rotated between its open and closed positions, the plug expander assembly 44 is moved to its neutral position by moving the expander handle 45 into parallel alignment with the plug actuator handle 36. With the expander assembly 44 in its neutral position, the plug segments 27-1, 27-2, 27-3 and 27-4 are free to move inwardly into their contracted position.

The roller bearings 55, 56, and 57, which freely rotate in the bores 52, 53 and 54 respectively, reduce the frictional drag between the plug expander 44 and the surface of the recess 34 which the outer cylindrical bearings 56 and 57 engage as the expander assembly 44 is rotated from its neutral position.

The quarter segments 27-1, 27-2, 27-3 and 27-4 resemble a keystone used in forming stone arches and therefore are sometimes referred to therein as keystone segments.

Referring now to FIGS. 7–12 of the drawings, a rotary, segmented, expandable ball valve in accordance with this invention is designated generally by the reference numeral 110 and embodies in its construction a prismatic valve body 111 which is provided with a central cylindrical opening 112 extending inwardly into the valve body from one end 113 and terminating short of the opposite end 114 leaving a closed bottom wall 115. The opening 112 serves as a valve chamber in which a segmented, rotary ball valve member, generally indicated at 116, is inserted through the open end 113 of the valve body. A pair of aligned, lateral cylindrical openings 111a and 111b extend through a pair of opposite sides of the valve body 111 and intersect perpendicularly with the cylindrical bore or opening 112. Tubular valve seat inserts 117 fit closely inside the lateral openings 111a and 111b and are sealed with respect to the lateral openings by O-rings seals 118 seated in circumferential grooves 118a formed in the exterior wall of the inserts 117. Each of the inserts 117 has an inner concave face 117a facing into the valve chamber 112 and an outer radial flange 117b secured against the outside of the valve body 111 by means of socketed cap screws 121. Bores 117c extend through the valve seat inserts 117 into the valve chamber 112 and form a fluid passage extending laterally through the valve body 111 and intersecting the valve chamber perpendicularly. The bores 117c are interiorly threaded inwardly through the flanges 117b for connecting the valve 110 with fluid conduits (not shown) in a fluid line. The valve body 111 is closed by a valve bonnet 120 which is secured to the open end 113 by means of a plurality of socketed cap screws 121 recessed in openings provided in the valve bonnet and threaded into the valve body. A plug portion 120' of the valve bonnet fits closely inside the outer end of the valve body opening 112 and is sealed therein by means of an O-ring seal 119. A central aperture 123 is provided in the bonnet through which a valve stem 122 extends outwardly. An O-ring seal 124 is provided in a groove 125 formed in the cylindrical wall 126 of the bonnet surrounding the aperture 123. The O-ring seal 124 provides a fluid tight seal between the valve bonnet 120 and the valve stem 122.

Figure 8:
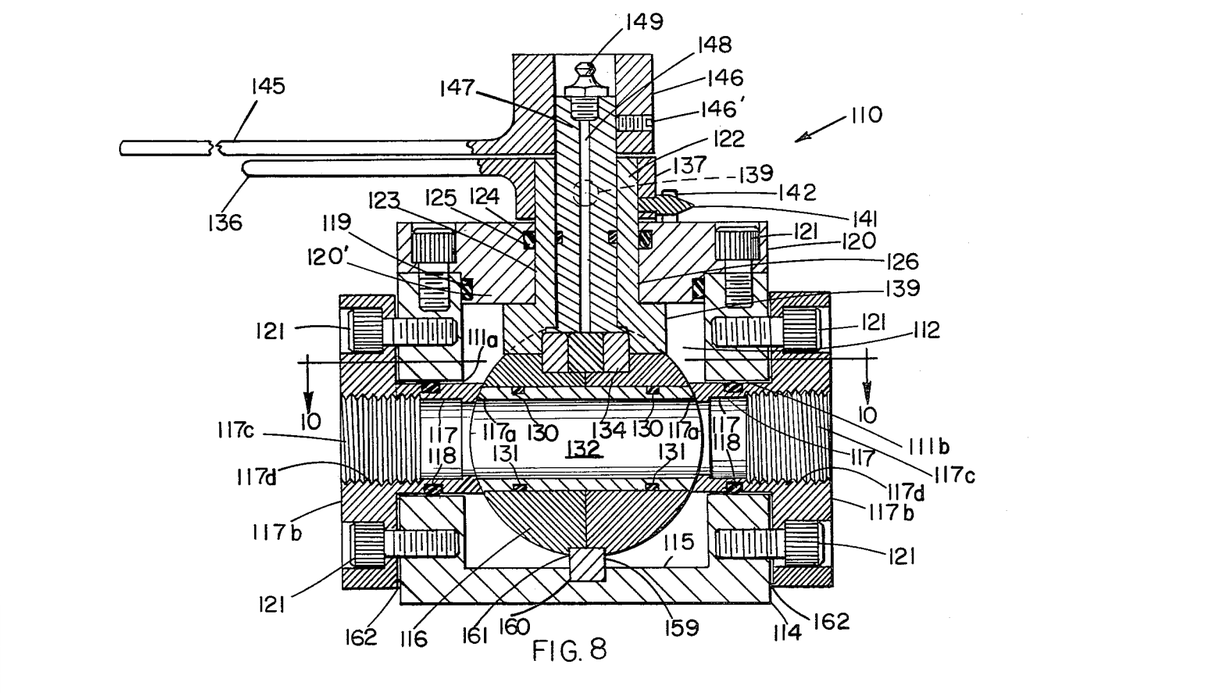
FIG. 8 is a sectional view taken on line 8—8 of FIG. 7.

The spherical ball valve 116 comprises four ninety-degree quarter segments 127, designated 127-1, 127-2, 127-3 and 127-4 respectively. Each of the quarter segments 127 has a spherical outer wall surface 127a, and flat side wall surfaces 127b and 127c. The planes in which the side wall surfaces 127b and 127c are located intersect each other at right angles along the axis of the ball valve. Two of the opposite ball valve segments 127-2 and 127-4 each have a bore 128 extending laterally therethrough in which a cylindrical tube 129 has its opposite ends fitted. Radially outwardly open grooves 130, 130 are formed circumferentially in the outer surface of the tube 129 to provide seats for O-ring seals 131, 131. The grooves 130, 130 are each spaced inwardly from the opposite ends of the tube 129 a short distance so that the O-ring seals 131 seated therein sealingly engage the cylindrical inner walls of the ball valve segments 127-2 and 127-4 surrounding the bores 128. The tube 129 has a through passage 132 therein which communicates with the lateral bores 117c in the valve housing when the ball valve 116 is in the open position as shown in FIG. 8. When the rotary ball 116 is in the closed position, the tube 129 is rotatably displaced ninety degrees from the position shown in FIG. 8 to the position shown in FIG. 11 where the tube is indicated by hidden lines.

Figure 10:
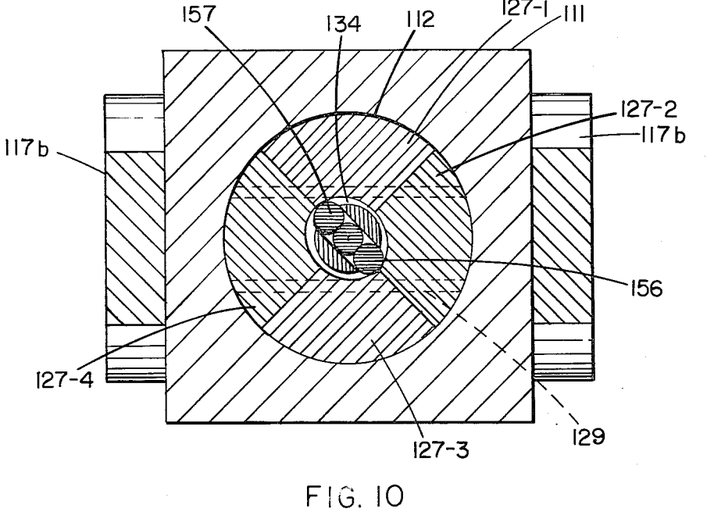
FIG. 10 is a sectional view taken on line 10—10 of FIG. 8 showing the ball valve in the open position.

Considering the segmented ball 116 as a whole, a generally elliptical recess 134 is provided centrally in the top of the ball as seen in FIG. 8. The major axis of the recess 134 extends in alignment with the interfaces between segments 127-4 and 127-1 and between segments 127-2 and 127-3 while the minor axis of the recess 134 extends in alignment with the interfaces between segments 127-1 and 127-2 and between segments 127-3 and 127-4 as seen in FIG. 10. A keyway 135 is provided diametrically across the top of the ball segments 127-2 and 127-4.

Figure 7:
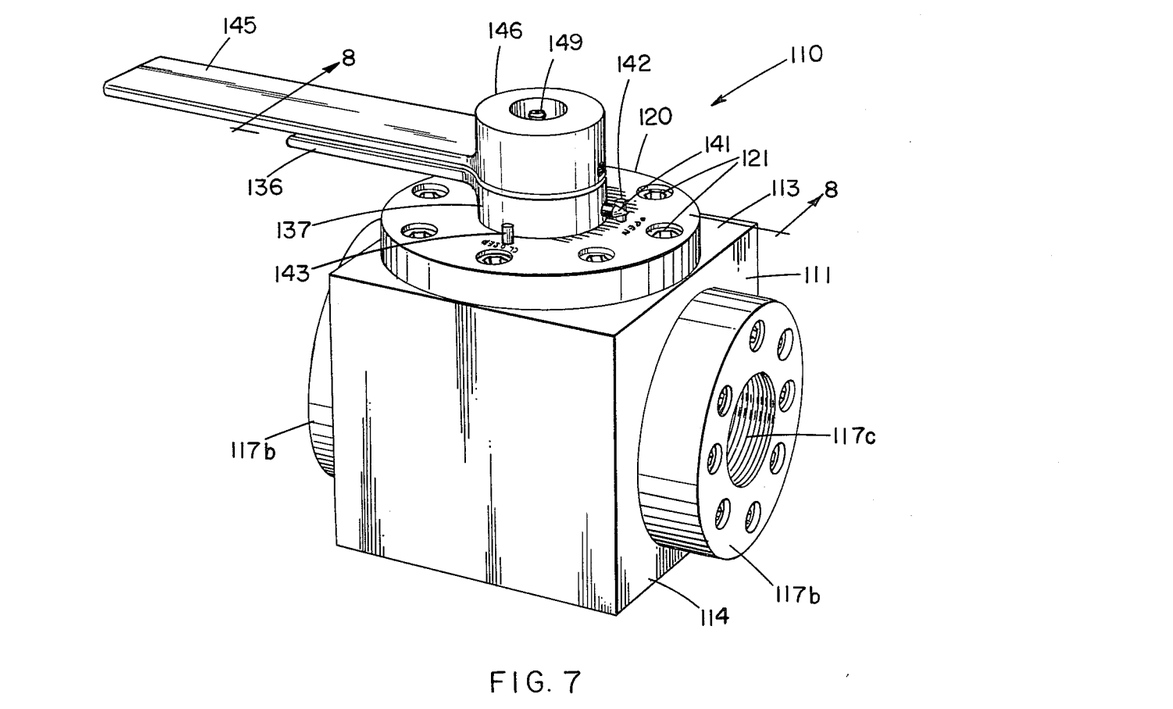
FIG. 7 is a perspective view of a rotary segmented, expansible ball valve forming a second embodiment of the invention.

An actuator for rotating the ball valve member 116 between its open and closed positions includes a handle 136 which projects laterally from a hub 137 surrounding the valve stem 122 and is secured thereon by means of a set screw 138. The cylindrical valve stem 122 extends downwardly through the valve bonnet 120. An annular radial flange 139 extends radially outwardly from the inner end of the valve stem 122, and an interrupted key 140 is integral with and depends from the underside of the flange 139. The key 140 engages in the keyway 135 of the valve segments 127-2 and 127-4 so that when the valve stem 122 is rotated by a turning force applied to the handle 136, the valve ball 116 is rotated by the splined engagement of the key 140 in keyway 135. The hub 137 includes a pointer 141 projecting outwardly therefrom diametrically opposite the handle 136. The pointer is adapted to move between a pair of limit stops 142 and 143 projecting upwardly from the valve bonnet 120. The limit stops are arcuately spaced about a circle which is concentric with the valve stem 122 so as to limit the movement of the pointer 141 through a ninety-degree arc from an open position as shown in FIG. 7 where the pointer engages the limit stop 142 to a closed position where the pointer engages the limit stop 143 and vice versa. Preferably the indicia "Open" and "Close" are engraved on the valve bonnet 120 beside the limit stops 142 and 143 respectively.

Figure 9:
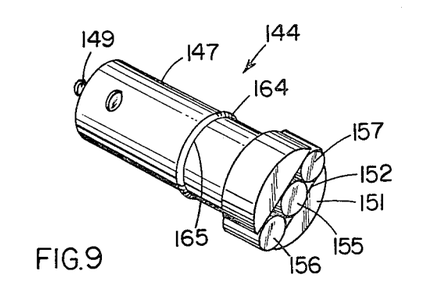
FIG. 9 is a perspective view of the expander assembly removed from the valve shown in FIG. 7.
Figure 11:
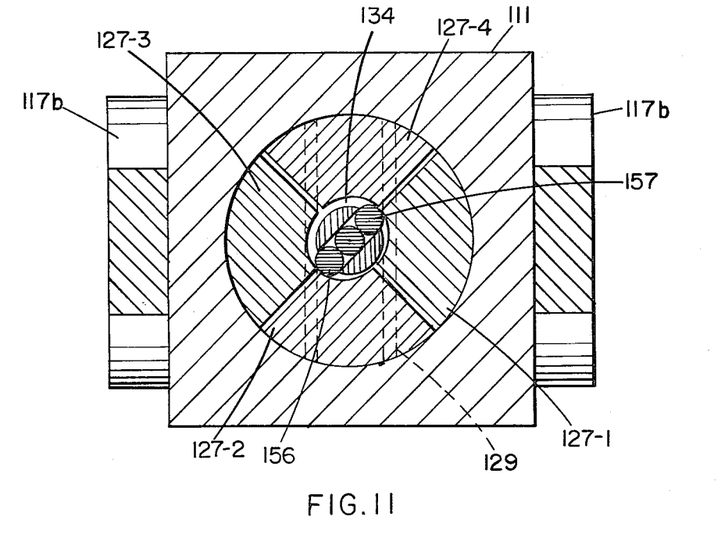
FIG. 11 is a sectional view corresponding to FIG. 10 but showing the ball valve in the closed position.
Figure 12:
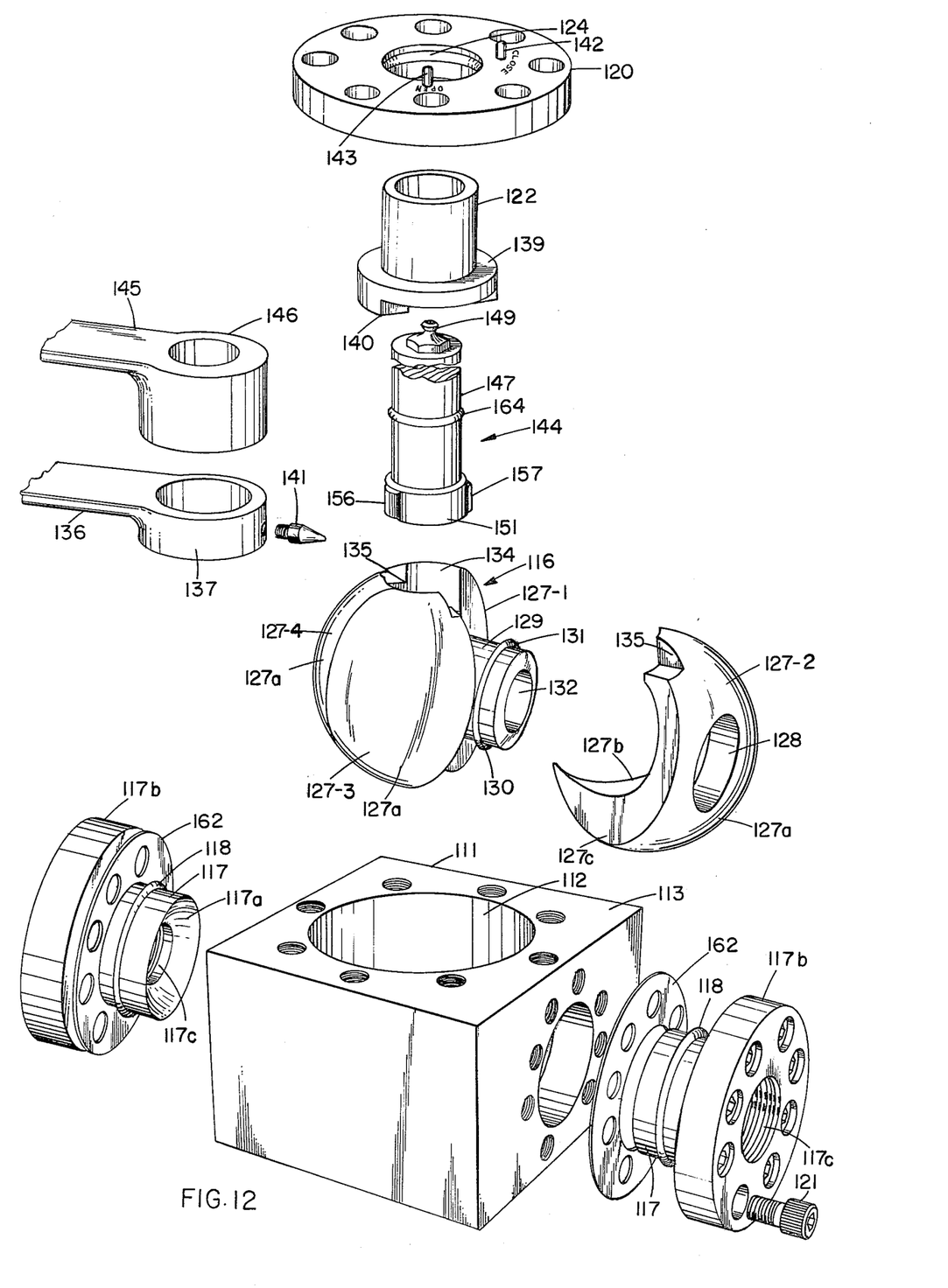
FIG. 12 is an exploded view of the ball valve shown in FIG. 7.

An actuator for expanding the ball valve segments 127 outwardly into metal to metal contact with the concave surfaces 117a of the valve seat inserts 117, comprises an expander assembly 144 illustrated in FIGS. 8 and 9, and an expander handle 145 attached to a hub 146 which is secured to one end of the expander assembly 144 by a set screw 146'. The expander assembly 144 includes a cylindrical expander stem 147 which extends upwardly through the hollow valve stem 122 and projects upwardly beyond the hub 137. The expander stem 147 has an axial bore 148 extending therethrough and a grease fitting 149 is secured to the outer end of the stem 147 in coaxial alignment with the axial bore 148 by screw threads. A cylindrical disk 151 of larger diameter than the expander stem 147 is integrally attached on the inner end of the expander stem. The diameter of the disk 151 is less than the minor axis of the recess 134 so that the disk is freely rotatable within the recess 134. The disk 151 has a diametrical slot 152 formed therein in which three cylindrical metal rollers or bearings 155, 156 and 157 of slightly less diameter than the width of the slot 152 are mounted. The distance across the three cylindrical bearings 155, 156, and 157 is greater than the length of the slot 152 so that the outer bearings 156 and 157 project past the ends of the slot 152 and thus they provide freely rotatable cam lugs on opposite sides of the disk 151. The diametrical distance across the three cylindrical bearings 155, 156 and 157 is less than the major axis across the recess 134 when the segments of the valve ball 116 are fully contracted, but it is substantially greater than the minor axis across the recess 134. In the contracted condition of the valve ball member 116, the cylindrical bearings 155, 156, and 157 will be aligned with the major diameter of the recess 134 in the valve member 116 as shown in FIGS. 10 and 11. It will be apparent that rotation of the expander stem 147 and disk 151 causes the outer cylindrical bearings 156 and 157 to engage the inner surfaces of an opposite pair of valve plug segments 127. Since the diametrical distance across the recess 134 decreases from the major axis to the minor axis of the recess (in the contracted condition of the valve ball), rotation of the disk 151 and of the bearings 155, 156, 157 cams the opposite pairs of segments 127 outwardly into tight contact with the concave surfaces 117a of the valve seat inserts 117, thus providing a tight metal to metal seal between the expanded opposite pair of valve segments and the valve seats. The expander stem 147 is sealed with respect to the hollow valve stem 122 by means of an O-ring seal 164 which is seated in a circumferential groove 165 provided in the stem 147 approximately midway of its length.

A dowel 159, provided in a central bore 160 at the bottom wall 115 of the valve body 111, projects upwardly into a cylindrical central recess 161 in the bottom of the ball member 116, and serves as a bearing post upon which the ball member rotates.

Shims 162 of selected thickness may be provided between the flange 117c of the valve seat inserts 117 and the valve body 111 in order to adjust the spacing of the valve seat faces 117a the desired distance from the ball member 116.

The operation of the rotary, segmented, expansible ball valve 110 will be understood from the following description:

The valve 110 as shown in FIGS. 7, 8 and 10 is in the open position with the opposed ball valve segments 127-2 and 127-4 and the tube 129 contained therein aligned with the fluid passages 117c through the valve body 111. The open position of the valve ball 116 is indicated by the pointer 141 attached to the hub of the valve ball actuator handle 136, since the pointer bears against the open position limit stop 142.

The position of the handle 145 for the ball valve expander actuator assembly 144 in parallel alignment with the handle 136 indicates that the ball valve expander assembly is in its neutral position as seen in FIG. 10. The expander actuator is in its neutral position when the aligned roller bearings 155, 156 and 157 are in alignment with the major axis of the oblong recess 134. With the ball valve 116 in the open position, the ball segments 127-2 and 127-4 containing the tube 129 may be expanded outwardly by turning the expander stem 147 counter clockwise (see FIG. 4), thereby forcing the outer roller bearings 156 and 157 against the eccentric wall surfaces of the ball segments 127-2 and 127-4 respectively within the recess 134. As the stem 147 is rotated counter clockwise by the long lever arm of the expander handle 145, a large force is applied through the bearings 156 and 157 for forcing the ball segments 127-2 and 127-4 to slide outwardly along the tube 129 and into metal to metal contact with the valve seats 117c.

When it is desired to close the valve 110, the handles 136 and 145 (in parallel alignment as shown in FIG. 1) are grasped and rotated clockwise simultaneously until the pointer 141 strikes the close limit stop 143. In so doing, the ball 116 is rotated clockwise to the position shown in FIG. 11 where the tube 129 (shown by hidden lines) and the ball segments 127-2 and 127-4 are perpendicular to the axis of the passages 117c extending through the valve body 111. The solid, or blind segments 127-1 and 127-3 are moved to a position closing the fluid passage 119. By turning the expander handle 145 clockwise past the ball actuator handle 136, the blind segments 127-1 and 127-3 are forced outwardly against the valve seats 117a, thus forming a metal to metal contact fluid seal and completely blocking the passages 117c on opposite sides of the valve chamber 112.

In order to unseal the valve 110 so that the ball 116 may be rotated between its open and closed positions, the ball expander assembly 144 is moved to its neutral position by moving the expander handle 145 into parallel alignment with the ball actuator handle 136. With the expander assembly 144 in its neutral position, the ball segments 127-1, 127-2, 127-3 and 127-4 are free to move inwardly into their contracted position.

The roller bearings 155, 156 and 157, which freely rotate in the slot 152, reduce the frictional drag between the ball expander 144 and the surface of the recess 134 which the outer cylindrical bearings 156 and 157 engage as the expander assembly 144 is rotated from its neutral position.

While the invention has been described in detail for the purpose of illustration, it will be obvious that numerous modifications and variations may be resorted to within the spirit and scope of the invention without departing from the claims.

What is claimed is:

1. A valve including a body having a fluid passage and a body opening intersecting said passage, said body opening being defined by an encompassing body wall, a valve member rotatably mounted in said body opening and divided into four expansible segments, two of said segments being opposed and forming one opposed pair, the other two of said segments being opposed and forming another opposed pair, said valve member having an opening to register with said fluid passage, said valve member opening extending through one opposed pair of said segments, the other opposed pair of said segments being solid and forming fluid stops when registered with said fluid passage, a tube lining said valve member opening, said one pair of opposed segments being slidably mounted on said tube, fluid sealing means for sealing each segment of said one opposed pair of segments with respect to said tube, means for rotating said valve member to register said valve member opening with said fluid passage in the open condition of said valve and to register said other pair of solid valve member segments with said fluid passage in the closed condition of said valve, valve seats surrounding said fluid passage on opposite sides of said valve body opening means for selectively expanding said opposed pairs of expansible valve member segments outwardly within said body opening into sealing contact with said valve seats.

2. The valve according to claim 1 wherein said body opening and said valve member are cylindrical, and each of said valve member segments is a quarter section of said cylindrical valve member.

3. The valve according to claim 1 wherein said means for rotating said valve member comprises a hollow valve stem having one end connected to said valve member and an opposite end projecting from said body through said body opening, and a handle secured to said opposite end of said valve stem for turning said stem.

4. The valve according to claim 1 wherein said valve member has a recess at one end facing outwardly through said body opening, said recess being oblong in shape and having a major axis lying in a plane extending through the interfaces of a first set of adjacent valve member segments and having a minor axis perpendicular to said major axis and lying in a plane extending through the interfaces of a second set of adjacent valve member segments, said selective expanding means comprising a cylindrical stem having one end extending from said body through said body opening and having at its other end a cylindrical disk which is rotatable within said oblong recess, said disk having cam lugs projecting from diametrically opposite sides of said disk for engaging the wall of said recess, the wall of said recess being formed of four wall sections, each section residing entirely within one of the plug segments and being gradually curved from a minimum radius corresponding to the radius of said minor axis to a maximum radius corresponding to the radius of said major axis, the maximum distance across said opposite cam lugs being less than the major axis of said recess and greater than the minor axis of said recess so that as said disk is rotated from a position where the opposite cam lugs are diametrically aligned with the major axis of said recess in either direction of rotation, said cam lugs engage the wall sections of opposed plug segments and force said opposed plug segments outwardly, and means secured to said one end of said cylindrical stem for turning said stem.

5. The valve according to claim 4 wherein said cylindrical disk has diametrically aligned cylindrical bores therein, there being at least two opposite outer bores and each of said outer bores having an arcuate segment of less than 180° lying outside of the circumference of said expander disk, and a cylindrical roller positioned in each of said outer cylindrical bores with a cylindrical surface portion thereof projecting outwardly from said disk and forming one of said opposite cam lugs.

6. The valve according to claim 4 wherein said means for rotating said valve member comprises a hollow stem having one end splined to said valve member and an opposite end projecting from said body through said body opening and a handle secured to said opposite end of said valve stem for turning said valve stem, said cylindrical expander stem being rotatably mounted concentrically within said hollow valve stem with said one end of said expander stem projecting outwardly from said opposite end of said valve member.

7. The valve according to claim 6 wherein said expander stem has an axial passage therethrough and a grease fitting mounted in said one end of said expander stem in communication with said axial passage for conducting grease into the interior of said valve body opening.

8. The valve according to claim 1 wherein said fluid sealing means comprises circumferential exterior grooves in said tube and O-ring seals seated in said grooves, each of said O-ring seals making sealing contact with a different one of said segments of said one opposed pair of segments.

9. The valve according to claim 2 wherein said valve seats comprise portions of the encompassing body wall defining said cylindrical body opening.

10. The valve according to claim 1 wherein said valve member is a ball and each of said valve member segments is a quarter section of said ball, said valve seats comprising valve seat inserts each having a concave sealing surface facing and conforming to the surface of said ball.

11. The valve according to claim 10 wherein said each of said valve inserts comprises a tubular portion having said concave sealing surface at one end of said tubular portion and a radial flange at the other end of said tubular portion, said tubular portions of said insert being inserted through said fluid passage on opposite sides of said opening with the concave sealing surface extending into said valve body opening and facing said ball, the flanges of said inserts being secured to said valve body outside of said fluid passage.

12. The valve according to claim 11 together with fluid seals for sealing said inserts in said passage.

13. The valve according to claim 3 together with a valve bonnet secured to said valve body and closing said body opening, said bonnet having an aperture therein through which said valve stem projects, said handle for turning said valve stem having a hub encompassing said valve stem and a lever arm projecting radially from said hub, a pointer attached to said hub and projecting radially from the hub diametrically opposite said lever arm, an open position stop and a close position stop mounted on said bonnet and intersecting the path of motion of said pointer as said handle is turned to rotate the valve stem, said open and close position stops being arcuately spaced to limit the turning motion of said pointer to substantially a ninety-degree arc between the open and closed positions of said valve.

* * * * *